Sept. 20, 1966  M. DEPENBROCK  3,274,482
FREQUENCY CHANGER FOR FREQUENCY CONVERSION OF THREE
PHASE ALTERNATING CURRENTS
Filed June 13, 1962  4 Sheets-Sheet 1
Fig. 1
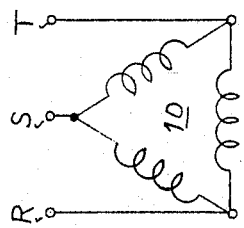
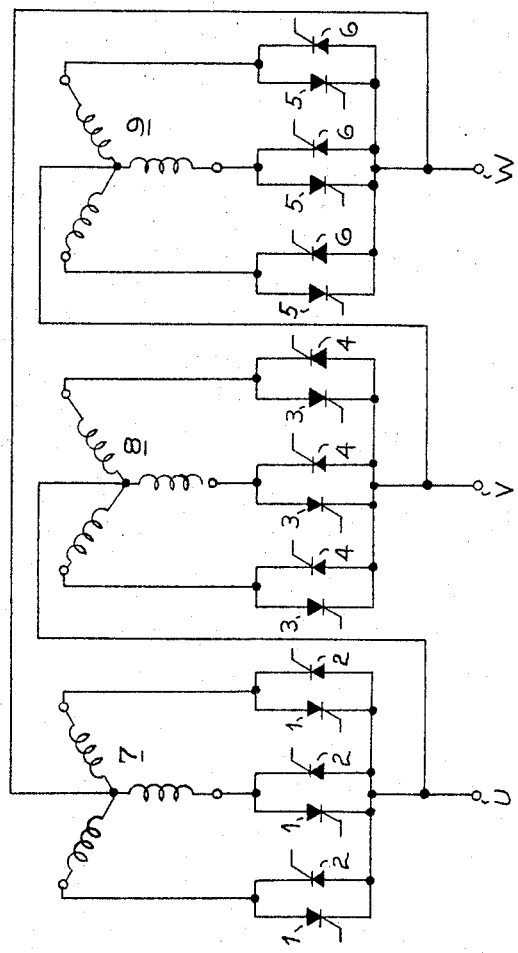
INVENTOR.
Manfred Depenbrock
BY
Pierce, Scheffler & Parker
Attorneys

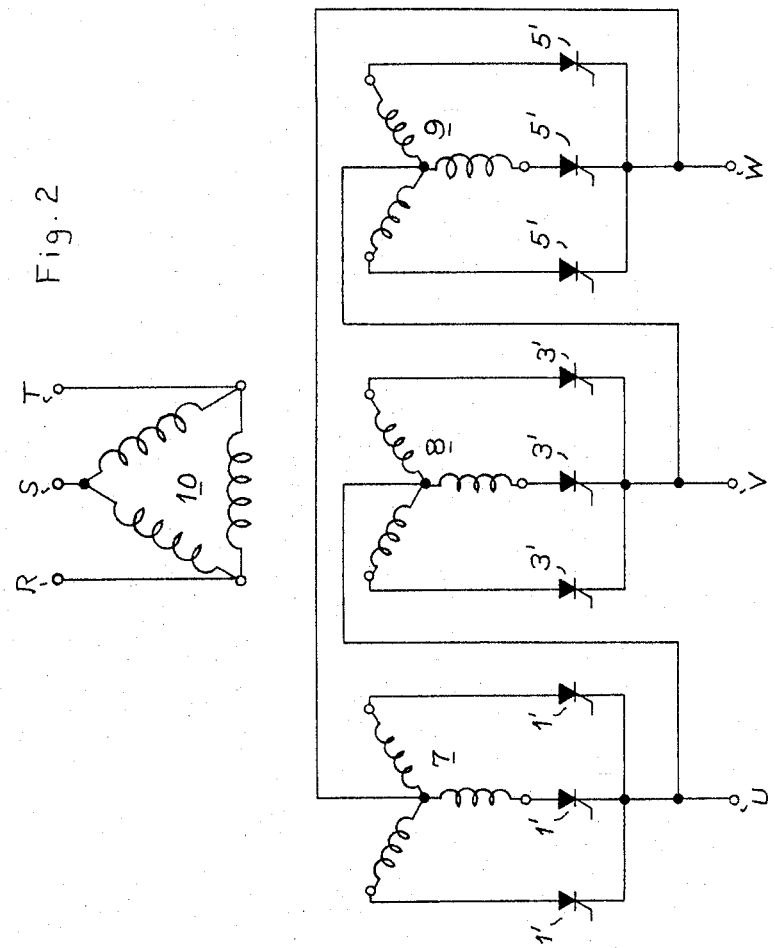

Sept. 20, 1966    M. DEPENBROCK    3,274,482
FREQUENCY CHANGER FOR FREQUENCY CONVERSION OF THREE
PHASE ALTERNATING CURRENTS
Filed June 13, 1962    4 Sheets-Sheet 3
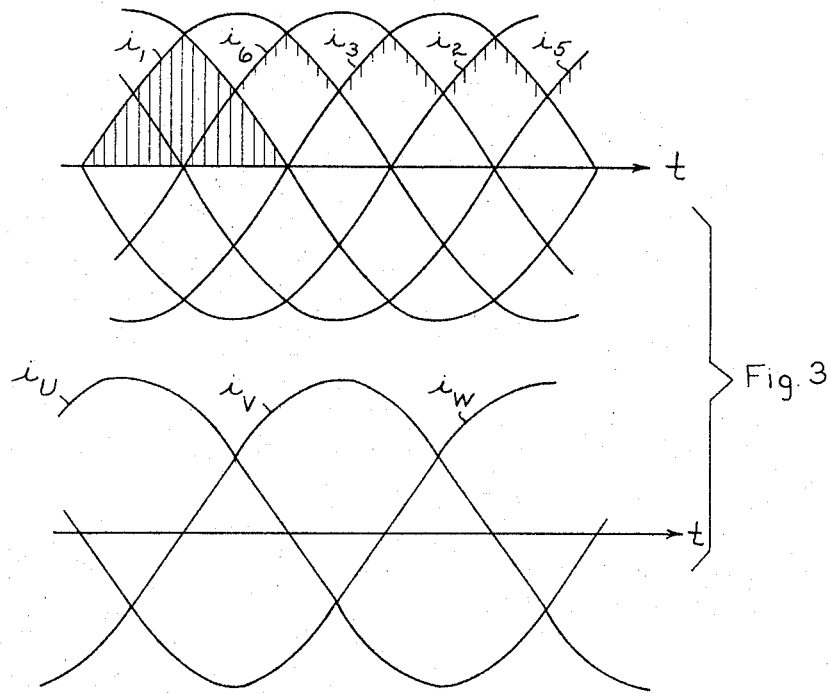
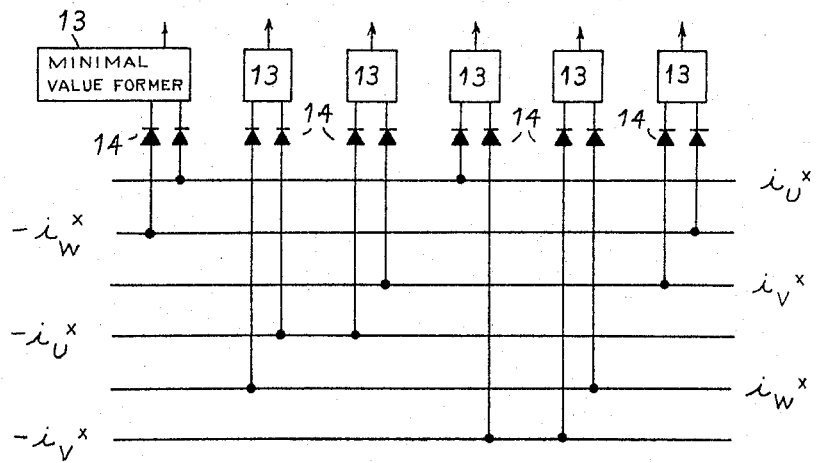
INVENTOR.
Manfred Depenbrock
BY
Pierce, Scheffler & Parker
Attorneys

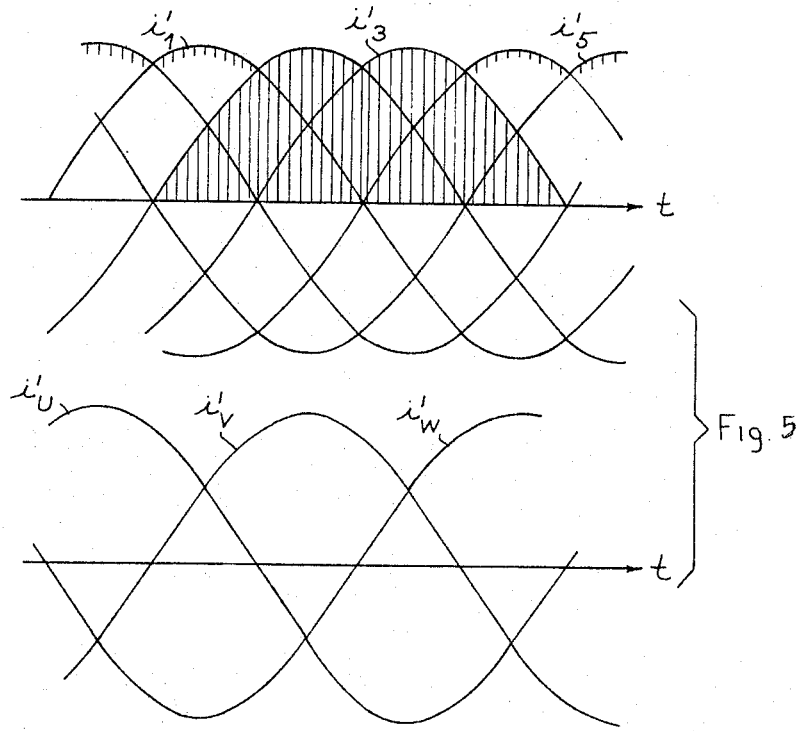
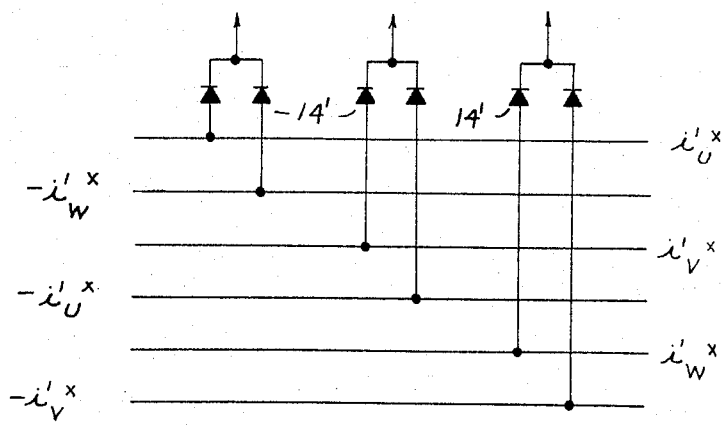
Fig. 5
Fig. 6
INVENTOR.
Manfred Depenbrock

United States Patent Office 3,274,482
Patented Sept. 20, 1966

3,274,482
FREQUENCY CHANGER FOR FREQUENCY CONVERSION OF THREE PHASE ALTERNATING CURRENTS
Manfred Depenbrock, Mannheim-Almenhof, Germany, assignor to Brown, Boveri & Cie Aktiengesellschaft, Mannheim, Germany, a joint-stock company
Filed June 13, 1962, Ser. No. 202,183
Claims priority, application Germany, June 13, 1961, B 62,874
6 Claims. (Cl. 321—69)

This invention relates to frequency changers for use on three-phase alternating current systems and particularly for producing a lower three-phase frequency from a higher frequency existing on a three-phase alternating current supply mains.

It has been shown to be advantageous, for the conversion of a three-phase alternating current (A.C.) of given frequency e.g. of mains frequency of a three-phase A.C. mains network into a three-phase A.C. current of differing frequency, to employ as a frequency changer known current rectifier arrangements with controlled gas discharge valves or with controllable semi-conductor valves. These frequency changers have, with respect to machine, i.e. dynamo electric, frequency changers, the advantage of achieving the desired frequency conversion with a relatively high degree of efficiency, and also that of exerting a practically inertia-free control. They are, therefore, particularly suitable for a frequency elastic current conversion.

Such a known arrangement of a three-phase frequency changer for frequency conversion of three-phase A.C. currents is constructed from three current rectifiers connected in anti-parallel and which are arranged group-wise in delta. The leads of the primary windings of the current rectifier transformers, which can also be combined to form a single transformer with common primary winding, represent one side of the three-phase current transmission while the connecting leads to the outer points of the delta connection of the current rectifier arrangement form the other side of the three-phase current transmission.

A particular importance has attached to such current rectifier arrangements for the rotor energisation of asynchronous motors wherein a three-phase current of the slip frequency and having variable amplitude and phase is fed to the rotor windings. In consequence of the feeding of each phase of the rotor winding of the asynchronous machine by way of rectifiers connected in anti-parallel, a large measure of control is achieved over the amplitude and phase position of the rotor currents relative to the phase position of the rotor voltages, so that in this way it is possible to establish or to control the speed, effective power and idle power of the asynchronous machine independently of one another.

In the case of such a rectifier arrangement it has been shown to be favourable from a control point of view that no special expense should be required to achieve an operation free of circulating currents, as circulating currents can only occur within rectifiers connected in anti-parallel of the individual phases. As is known, these circulating currents can be eliminated if in each case a valve group of the anti-parallel arrangement is held in the blocked condition. On the other hand the delta-connected arrangement has the drawback that the linked voltages which appear as output alternating current voltages are $\sqrt{3}$ times larger than the phase voltages produced by the current rectifiers and applied to the windings, this having the consequence that, when relatively low consumer voltages are required, the current rectifiers are unfavourably used. On the other hand it is often not possible, for example with the use of current rectifiers for the rotor energisation of asynchronous machines, for reasons of insulation or for constructional reasons to select such high values for the linked voltage of the rotor windings as would be suitable for a favourable use of the discharge valves of the current rectifiers.

As will be shown hereinafter these drawbacks may be avoided by selecting a delta connection of the three current rectifier devices. In this connection it has been shown to be possible to obtain in a simple manner, an operation free of circulating currents by freeing only two rectifiers of each group at any given moment for current conduction.

The invention thus relates to a frequency changer for the conversion of three-phase alternating currents, particularly for the production of low frequency alternating currents from three-phase alternating currents of mains frequency, and which consists of an arrangement of a plurality of individual regulable current rectifiers in the form of grid controlled gas discharge devices or controllable semiconductor valves. With regard to the two existing possibilities of forming the frequency changer according to the invention, this can be composed of three groups of six or also of three groups of three individual current rectifiers.

According to the first mentioned embodiment of the frequency changer wherein accordingly eighteen rectifiers are utilized, the invention proposes to connect in delta three pairs of anti-parallel connected individual current rectifiers together with their feeding transformer windings, and to so control them that at any given movement only two rectifiers of each six rectifier group are free to conduct current, while the other four rectifiers of that group are blocked and are prevented from conducting current, the supply of the three-phase alterating currents fed to the consumer being effected at the angle points of the delta formation.

According to the second embodiment of the frequency changer wherein nine rectifiers are utilized, the invention proposes to connect the three individual current rectifiers together in delta with their feeding transformer windings and to so control them that at each moment only two rectifiers of a three rectifier group are free to conduct current while the third rectifier of each group is blocked and prevented from conducting current, the supply of the three-phase alternating currents fed to the consumer being effected at the angle points of the delta formation.

In the case of both of these embodiments of the frequency changer, the individual current rectifiers of each group which conduct current are variably controlled in such manner that the alternating currents supplied to the angle points of the delta formation are substantially sinusoidal.

The foregoing advantages and objects of the invention will become more apparent from detailed descriptions of the two embodiments which have been discussed and from the accompanying drawings. In these drawings:

FIGURE 1 is an electrical circuit diagram of that embodiment of the invention wherein three groups of six rectifiers each are utilized;

FIGURE 2 is also an electrical circuit diagram of the other embodiment of the invention wherein three groups of three rectifiers each are utilized;

FIGURE 3 illustrates ideal wave forms and relation of the lower frequency alternating currents established by the frequency changer circuit of FIG. 1;

FIGURE 4 is a circuit diagram showing an arrangement for forming the necessary control voltages for use in controlling the rectifiers of the FIG. 1 embodiment;

FIGURE 5 is a view similar to FIG. 3 illustrating ideal wave forms and their relation for the lower frequency alternating currents produced by the FIG. 2 embodiment; and FIGURE 6 is a view similar to FIG. 4 showing the manner of producing the necessary control voltages for the rectifiers of the embodiment according to FIG. 2.

Referring now to the drawings and to FIGURES 1, 3 and 4 in particular, FIGURE 1 represents in simplified form a circuit arrangement of three frequency changers of which each is represented by a pair of individual current rectifiers connected in anti-parallel manner. Each of these individual frequency changers is formed in three-phase manner and has three regulable valves constituted by regulable semi-conductor valves or by grid controlled gas discharge valves. With each two valves connected in anti-parallel manner is associated a common secondary transformer winding which forms a phase of the three-phase frequency changer. The three semi-conductor valves of the three groups for one direction of the current are designated by 1, 3, 5 and those of the other current direction by 2, 4, 6. With the three groups of six semi-conductor valves connected in anti-parallel manner are respectively associated in the above described manner the secondary transformer windings 7, 8, 9. The associated common primary winding 10 is connected in delta.

The frequency changers each consisting in the embodiment shown in FIGURE 1 of three pairs of valves and a transformer winding connected in star are connected in delta according to the invention. The corner or angle points of the delta connection form the connection points, designated by U, V, W, for the consumer (not shown) of the frequency changer arrangement. The associated primary winding is connected to the phases R, S, T of the three-phase current network of the normal mains frequency.

Each of these frequency converters is controlled in elastic manner with respect to frequency; the frequency of the alternating voltages formed by the frequency changers is intended to be small with respect to the frequency of the mains A.C. voltages applied to R, S, T. The individual valve circuits of the frequency changers are according to requirements variably part-controlled for rectifier or inverter operation. The curve shape of the A.C. voltages of the frequency changers obtained in this way corresponds in known manner to the outline of the individual curve section of the network A.C. voltages produced by shifting of the valve circuits. The control of the valve circuits takes place in a manner to be described in greater detail hereinafter with respect to FIGURE 4 by means of a control device to which the A.C. currents to be obtained are fed in advance as desired value. The control impulses which are variable in time supplied by this control device produce an A.C. voltage of the frequency changers which is required for the alternating current which it is desired to produce.

The six individual rectifiers comprising valve groups 1–6 forming the three frequency changers of the three phases U, V, W are so arranged according to the invention, for the elimination of circulating currents, that at any time only two individual rectifiers are free to conduct current, while the other four individual rectifiers in each group are blocked or prevented from conducting current. Thus the whole frequency changer arrangement can be formed as a so-called "V-control" having the distinctive feature that the individual rectifiers forming the V are continuously changing.

The formation of the low frequency A.C. currents supplied to the consumer and designated by $i_U$, $i_V$, $i_W$ is clear from FIGURE 3. The individual current rectifiers are variably part-controlled in such manner that the momentary values of their currents, which are indicated by $i_1 \ldots i_6$ have, in dependence on the time $t$, the approximately triangular shape shown in the upper section of FIGURE 3. Their duration of current flow in each case amounts to 120° relative to the periodic duration of the low frequency A.C. currents $i_U$, $i_V$, $i_W$ supplied. The associated curved portions, indicated by hatching, of the currents are parts of the sinusoidal curves shown in thin continuous lines. By appropriate juxtaposition of these currents, purely sinusoidal A.C. currents $i_U$, $i_V$, $i_W$ are produced in the consumer circuit. This sinusoidal curve shape is produced by juxtaposition of currents according to $$i_U = i_1 + i_4 - (i_2 + i_3)$$
$$i_V = i_3 + i_6 - (i_4 + i_5)$$
$$i_W = i_5 + i_2 - (i_6 + i_1)$$

The above-mentioned control of the individual current rectifiers takes place by means of a control device to which are fed in advance the required sinusoidal alternating currents $i_U$, $i_V$, $i_W$ as desired values. These desired values, represented for example by current-proportional voltages, are hereinafter designated as $i_U^x$, $i_V^x$, $i_W^x$.

As is clear from FIGURE 3, each two desired value curves form the triangular curves located in the upper portion of the figure and shown by hatching; there is juxtaposed to each of the desired values, e.g. to $i_U^x$, a negative desired value of the phase preceding it or following it in time e.g. $-i_W^x$ or $i_V^x$, and the momentary value of the smallest of each of these desired values is used for controlling the individual current rectifiers.

For formation of each smallest value there is provided a device shown diagrammatically in FIGURE 4. This device consists of six so-called minimal value formers 13 of known manner of operation, for example, as described in German Patent No. 1,081,129 and which are each connected via diodes 14 to two voltages corresponding to the desired values of the currents e.g. $i_U^x$ and $-i_W^x$. These diodes only permit the positive half waves of these voltages to be effective and from these the voltage, with the smallest momentary value in each case, is selected and supplied as control voltage to the regulable rectifiers 1 . . . 6 in FIGURE 1. This voltage has the triangular shape shown in the upper part of FIGURE 3.

With respect to the arrangement of FIGURE 1 it is also to be noted that each two individual current rectifiers, insofar as these are constituted by grid controlled gas discharge rectifiers, have a common cathode potential. In consequence thereof, the whole frequency changer arrangement may be constructed from three multi-anode current converter tubes. Further only one transformer is needed for three separate secondary winding systems. When single anode current converter tubes or regulable semi-conductor valves are used, naturally it is possible to feed the valves connected in anti-parallel manner from a common transformer winding, and this arrangement is in fact used in the present instance.

For forming three low frequency sinusoidal output currents $i_U$, $i_V$, $i_W$ it is not absolutely necessary to use three groups of six controlled individual current rectifiers each arranged in pairs connected in anti-parallel manner. It is also possible to obtain the same currents with three groups of three individual current rectifiers. The circuit diagram of such with three groups of three regulatable semi-conductor rectifiers 1', 2' and 3' is shown in FIGURE 2. In this latter arrangement, two individual current rectifiers are permitted to conduct current at each moment, while the third rectifier in each case is blocked and prevented from conducting.

In FIGURE 5 can be seen the formation of the three sinusoidal low frequency alternating currents $i'_U$, $i'_V$, $i'_W$ supplied to the consumer. The individual current rectifiers so controlled that the momentary values of their currents, which are indicated by $i'_1$, $i'_2$, $i'_3$, have the shape shown in the upper part of FIGURE 5. The duration of their current flow in each case amounts to 240° relative to the periodic duration of the low frequency A.C. currents $i'_U$, $i'_V$, $i'_W$ supplied. The associated hatched curved portions of the currents are parts of the sinusoidal curves shown in thin continuous line. By suitable juxtaposition of these currents the pure sinusoidal A.C. currents $i'_U$, $i'_V$, $i'_W$, are produced in the consumer circuit. This sinusoidal curve shape is obtained by the juxtaposition of the currents according to $$i'_U = i'_1 - i'_3$$
$$i'_V = i'_3 - i'_5$$
$$i'_W = i'_5 - i'_1$$

The control of the individual current rectifiers again takes place by way of a control device to which the sinusoidal alternating currents $i'_U$, $i'_V$, $i'_W$ are fed in advance as desired values. These desired values represented by voltages proportional to currents for example are $i'_U{}^x$, $i'_V{}^x$, $i'_W{}^x$.

As can be seen from FIGURE 5 the curves shown above in the figure, and emphasized by hatching, can each be formed by two desired value curves; that is done by combining one of the desired values in each case e.g. $i'_U{}^x$ with a negative desired value of the phase preceding in time e.g. $-i'_W{}^x$, and applying the greatest of these desired values in each case for controlling the individual current rectifiers.

The evaluation of these desired values and formation of the control voltages for the individual current rectifiers is effected by a maximal value former constituted by a diode arrangement shown in FIGURE 6. This consists of three groups 14′ of two diodes each which on one side are connected to two voltages corresponding to the desired values of the currents e.g. $i'_U{}^x$ and $i'_W{}^x$, and on the other side they are connected together. This arrangement has the feature of delivering only positive values and of these the greatest of each two desired values as control voltage. In this way these control voltages are given the curve shape shown in the upper part of FIGURE 5 and indicated by hatching.

The control voltages formed in the above described manner are the desired value voltages of the control device which, after previous deduction of the actual value voltages, delivers those control voltages to each associated individual current rectifier 1′ . . . 3′ which are necessary for the appropriate control thereof.

I claim:

1. In a frequency changer for frequency conversion of three-phase alternating currents, particularly for the production of lower frequency three-phase alternating currents from three-phase alternating currents of mains frequency, the combination comprising three groups of six rectifiers each corresponding to the three phases, said rectifiers being of the controllable type, means arranging the six rectifiers of each group in three pairs with the rectifiers of each pair arranged anti-parallel, said rectifier pairs being connected respectively to the corresponding windings of a three-phase supply transformer operating at the mains frequency, means connecting said three groups of rectifiers in delta formation, the supply of the lower frequency three-phase alternating currents to the consumer being tapped at the angle points of said delta formation, and means controlling operation of said rectifiers of each group such that at any given moment only two rectifiers of each six-rectifier group are free to conduct current while the other four rectifiers of that group are blocked and prevented from conducting current.

2. A frequency changer as defined in claim 1 wherein said means for controlling operation of the six rectifiers of each group is constituted by a control device producing a voltage output derived from current proportional voltages representing sinusoidal alternating currents in the consumer circuit, said control device including means forming the difference between each two voltages of phases differing in time and a minimal value former determining the smallest value in each case of the positive half waves of said voltages.

3. A frequency changer as defined in claim 2 wherein said control device includes diodes for determining the positive half waves of said voltages representing the desired values of said sinusoidal alternating currents, each two of said diodes being connected on one side to an alternating current voltage and to an alternating voltage of opposite polarity and of a phase differing in time, being connected on the other side to produce said voltage output of said control device which serves as a control voltage for the associated individual current rectifier.

4. In a frequency changer for frequency conversion of three-phase alternating currents, particularly for the production of lower frequency three-phase alternating currents of mains frequency, the combination comprising three groups of three rectifiers each corresponding to the three phases, said rectifiers being of the controllable type, means arranging the three rectifiers of each group in circuit with the corresponding windings of a three-phase transformer operating at the mains frequency, means connecting said three groups of rectifiers in delta formation, the supply of the lower frequency three-phase alternating currents to the consumer being tapped at the angle points of said delta formation, and means controlling operation of said rectifiers of each group such that at any given moment only two rectifiers of each three rectifier group are free to conduct current while the third rectifier of that group is blocked and prevented from conducting current.

5. A frequency changer as defined in claim 4 wherein said means for controlling operation of the three rectifiers of each group is constituted by a control device producing a voltage output derived from current proportional voltages representing sinusidal alternating currents in the consumer circuit, said control device including means forming the difference between each two voltages of phases differing in time and a maximal value former determining the highest value in each case of the positive half waves of said voltages.

6. A frequency changer as defined in claim 5 wherein said control device includes diodes for determination of the positive half waves of the voltages representing the desired values of said sinusoidal alternating currents, each two diodes being connected on one side to an alternating current voltage and to an alternating current voltage of opposite polarity and of a phase preceding in time and being connected together on the other side to said maximal value former, the points of connection of the diodes producing said voltage output of said control device which serves as a control voltage for the associated rectifier.

References Cited by the Examiner

UNITED STATES PATENTS

| | | | |
|---|---|---|---|
| 1,934,219 | 11/1933 | Widmer et al. | 321—66 |
| 2,178,432 | 10/1939 | Peterson | 321—60 |
| 2,623,204 | 12/1952 | Solomon | 321—7 |
| 2,905,880 | 9/1959 | Hess | 321—66 X |
| 3,170,107 | 2/1965 | Jessee | 321—61 |

JOHN F. COUCH, *Primary Examiner.*

LLOYD McCOLLUM, *Examiner.*

G. J. BUDOCK, G. GOLDBERG, *Assistant Examiners.*